F. L. JONES.
Press-Ring for Cheese-Press.

No. 218,979.  Patented Aug. 26, 1879.

WITNESSES
E. J. Nottingham
F. O. McCleary

INVENTOR
Frank L. Jones
By H. A. Seymour
ATTORNEY

UNITED STATES PATENT OFFICE.

FRANK L. JONES, OF UTICA, NEW YORK.

IMPROVEMENT IN PRESS-RINGS FOR CHEESE-PRESSES.

Specification forming part of Letters Patent No. 218,979, dated August 26, 1879; application filed June 30, 1879.

*To all whom it may concern:*

Be it known that I, FRANK L. JONES, of Utica, in the county of Oneida and State of New York, have invented certain new and useful Improvements in Press-Rings for Pressing Cheese; and I do hereby declare the following to be a full, clear, and exact description of the invention, such as will enable others skilled in the art to which it pertains to make and use it, reference being had to the accompanying drawings, which form part of this specification.

My invention relates to an improvement in press-rings for pressing cheese, the object being to provide press-rings, which shall be of small initial cost, and durable and effective in use.

Heretofore press-rings for pressing cheese have been made of wood, sheet metal, elastic rubber, and of gutta-percha. Wood press-rings have been found to be practically valueless by reason of the fact that they are so easily broken, and, further, because they cannot be made to expand and conform to the irregular surfaces of the cheese-hoops ordinarily used. Metal press-rings are objectionable for the reason that they cannot be made to fit snugly the interior of the cheese-hoops, and hence they allow the curd to escape between the follower and cheese-hoop. Again, a press-ring made wholly of sheet metal soon becomes forced out of shape by hard usage, and thus rendered unfit for use. Rubber and gutta-percha press-rings soon become soft when subjected to contact with the whey and curd, and hence the outer or wearing edge or periphery is soon worn away, and the curd and whey allowed to be forced past the follower. Rubber and gutta-percha press-rings are quite expensive in first cost, and, further, will not admit of ready repair when unduly worn.

My invention consists in a press-ring for pressing cheese, consisting of an annular flat ring of leather adapted to fit snugly within the cheese-hoop, and to tightly pack the joint between the follower and cheese-hoop.

My invention further consists in a press-ring composed of an annular ring of leather, or equivalent material, provided with a metal stiffening-rim.

Figure 1:
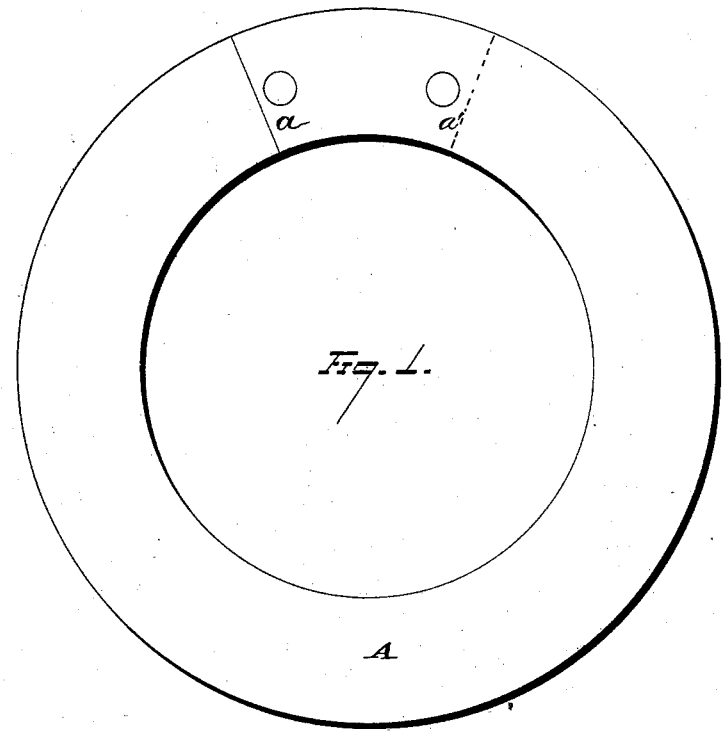
Figure 2:
Figure 3:
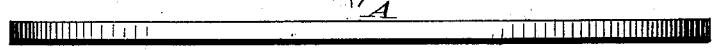

In the accompanying drawings, Figure 1 is a plan view of my improved press-ring. Fig. 2 is a transverse section of the same. Fig. 3 is a side elevation, showing the form of the press-ring when pressure is applied thereto; and Figs. 4 and 5 are transverse sections of modified forms of construction.

A represents a press-ring made of leather, said ring being made either in a single piece, without seam or joint, or of two or more sections, with their ends chamfered off and riveted together, as shown at *a a'* in the drawings. The ring is preferably beveled transversely to insure a thick outer and wearing edge and thin inner edge. This form allows the ring, to be readily contracted and inserted in place, and further insures the desired resistance and wearing-surface to the outer edge of the ring.

The press-ring made of leather is specially adapted for the purpose intended, for the reason that the acids of the whey and curd have the effect of hardening the leather, and thus increase its power of resistance to the pressure of the follower, and, further, to decrease the wear of the ring.

Figure 4:
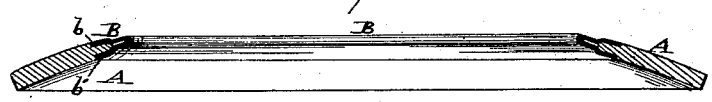
Figure 5:
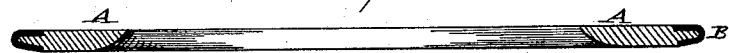

Fig. 4 represents a modified form of construction, A representing the leather ring, and B a metallic stiffening ring or fillet, between the edges *b b'* of which the inner edges of the leather ring A are tightly clamped.

Ring B may be made of sheet copper, tin, or iron, or it may be cast or molded, and may be secured to the leather ring solely by having pressure applied thereto; or, if desired, it may be secured by rivets inserted through the leather and metal ring or fillet. The leather ring is formed in such a manner that its outer edge will extend below the metal ring or fillet, the leather ring being slightly crown-shaped, whereby pressure being applied to the press-ring it will expand radially and fit snugly against the interior surface of the cheese-hoop, and thus tightly pack the joint between the follower and cheese-hoop.

If desired, the outer edge of the ring may be provided with a metal band or fillet, as illustrated in Fig. 5.

My improved press-rings are of small first cost, are very effective in use, and of great durability, and, further, may be readily repaired at slight expense.

Again, I do not limit myself to the particular form of metal ring or fillet illustrated in the accompanying drawings.

The strengthening-ring of metal may be an annular flat ring, riveted or otherwise secured to either the inner or outer edge of the leather ring; or it may be made of any other form whereby it will subserve the desired purpose.

Having fully described my invention, what I claim as new, and desire to secure by Letters Patent, is—

1. A press-ring for pressing cheese, consisting of an annular ring of leather, substantially as set forth.

2. A press-ring consisting of an annular ring of leather provided with a metal ring or fillet on either or both outer and inner edges, substantially as set forth.

3. A press-ring consisting of an annular ring of leather provided with a metal ring or fillet, said leather ring formed crown-shaped, that it may expand radially when subjected to pressure, substantially as set forth.

In testimony that I claim the foregoing I have hereunto set my hand this 25th day of June, 1879.

FRANK L. JONES.

Witnesses:
J. L. LYNCH,
WILLIAM E. LEWIS.